(12) United States Patent
Matsumoto

(10) Patent No.: US 6,993,208 B2
(45) Date of Patent: Jan. 31, 2006

(54) IMAGE PROCESSING APPARATUS AND ITS PROCESSING METHOD

(75) Inventor: Atsushi Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 10/176,176

(22) Filed: Jun. 21, 2002

(65) Prior Publication Data
US 2003/0001867 A1  Jan. 2, 2003

(30) Foreign Application Priority Data
Jun. 25, 2001 (JP) .............................. 2001-191843

(51) Int. Cl.
*G06K 9/32* (2006.01)

(52) U.S. Cl. .................. 382/298; 345/660; 348/561; 348/581; 358/1.2; 358/451; 358/525; 358/528; 382/260; 382/279

(58) Field of Classification Search ............... 348/561, 348/578, 581, 700; 358/1.2, 1.9, 448, 451, 358/525; 382/168, 260, 261, 274, 275, 279, 382/283, 287, 298, 299, 300, 304, 305
See application file for complete search history.

(56) References Cited
U.S. PATENT DOCUMENTS

| | | | | |
|---|---|---|---|---|
| 4,860,118 A | | 8/1989 | Arimoto | ..................... 358/451 |
| 5,241,372 A | * | 8/1993 | Ohba | ......................... 348/578 |
| 5,526,446 A | * | 6/1996 | Adelson et al. | ............. 382/275 |
| 6,104,832 A | | 8/2000 | Saito et al. | .................. 382/176 |
| 6,188,803 B1 | * | 2/2001 | Iwase et al. | ................ 382/300 |
| 6,263,119 B1 | * | 7/2001 | Martucci | .................... 382/298 |
| 6,674,920 B1 | * | 1/2004 | Ishikawa | .................... 382/298 |
| 6,757,442 B1 | * | 6/2004 | Avinash | ..................... 382/274 |
| 6,788,353 B2 | * | 9/2004 | Wredenhagen et al. | ..... 348/581 |

* cited by examiner

*Primary Examiner*—Daniel Miriam
*Assistant Examiner*—Gregory Desire
(74) *Attorney, Agent, or Firm*—Fitzpatrick, Cella, Harper & Scinto

(57) ABSTRACT

Upon scaling input image data and outputting the scaled image data, an address arithmetic processor determines phase information, which indicates the distances between the position of the pixel of interest after scaling and neighboring pixels of an original image, in accordance with the scale of that scaling, a coefficient arithmetic processor calculates filter coefficients in a filter process in accordance with the determined phase information, and a filter processor executes the filter process of the input image data by convolution operations on the basis of the calculated filter coefficients and outputs multi-valued image data. An LUT converts the density of the multi-valued image data in correspondence with the density characteristics of a printer, and a binarization processor binarizes the multi-valued image data and outputs binary image data to an image storage unit.

16 Claims, 13 Drawing Sheets

F I G. 18
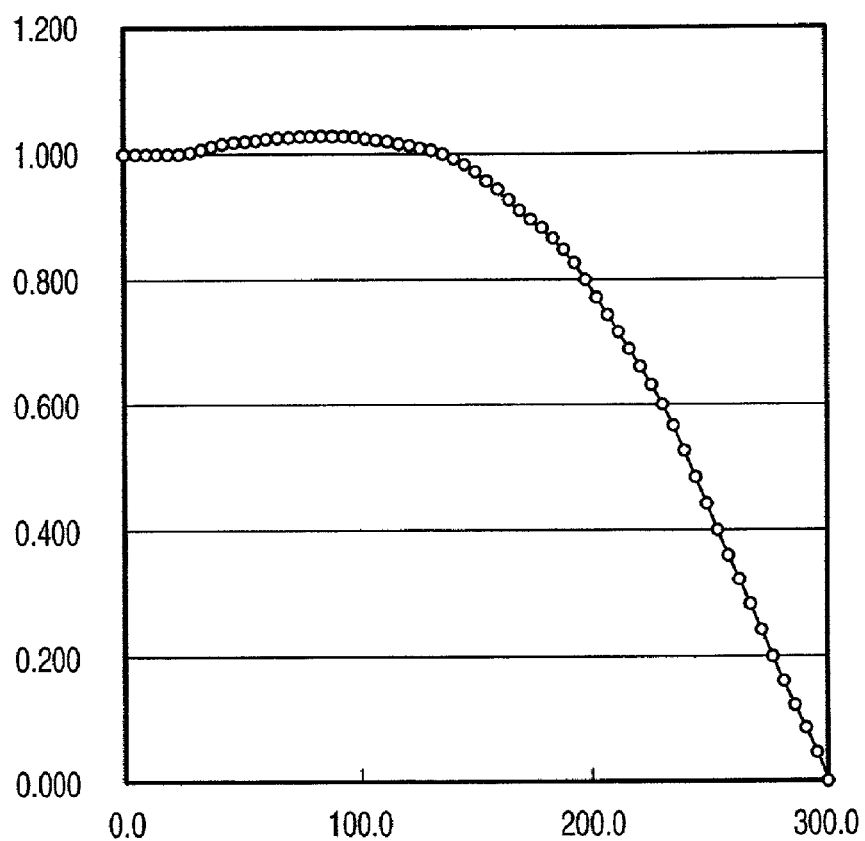

ND ITS PROCESSING METHOD

IMAGE PROCESSING APPARATUS AND ITS PROCESSING METHOD

FIELD OF THE INVENTION

The present invention relates to an image processing apparatus for scaling input image data, and outputting the scaled image data, and its processing method.

BACKGROUND OF THE INVENTION

In recent years, as a scaling process for images, a "nearest neighbor method" for selecting a pixel of original image data which is nearest to the pixel of interest after scaling is known.

Also, a process such as a "bi-cubic method" or the like is well known.

However, since the "nearest neighbor method" uses only the nearest pixel data, deterioration of an image is considerable, e.g., moiré is generated, and pixels look coarse upon up-scaling.

On the other hand, the "bi-cubic method" can assure higher image quality than the "nearest neighbor method". However, since it maintains high resolution, when a document with periodicity, e.g., a printed document, is scanned and undergoes an image process upon down-scaling, moiré fringes are generated and the image quality deteriorates.

Especially, when a binary image undergoes scaling, deterioration of an image is considerable. When a binary image is scaled at a scale near 100%, even an image of a document having no periodicity suffers periodic density nonuniformity, resulting in poor appearance.

In another method, a binary image may be temporarily converted into a multi-valued image, which may then undergo scaling. However, with such method, the storage size of an image storage device and the image transfer size increase.

SUMMARY OF THE INVENTION

The present invention has been made to solve the above-mentioned problems, and has as its object to provide an image processing apparatus which can implement scaling that can suppress generation of a periodic stripe pattern such as moiré without excessively decreasing the resolution by executing a filter process in accordance with phase information for each pixel of interest and a phase information control parameter used to control the frequency characteristics of a filter, and its processing method.

In order to achieve the above object, according to one aspect of the present invention, there is provided an image processing apparatus for scaling input image data, and outputting the scaled image data, comprising; means for designating a scale; phase information determination means for determining phase information, which indicates distances between a position of a pixel of interest after scaling, and neighboring pixels of an original image, for each pixel of interest after scaling; coefficient arithmetic means for calculating a filter coefficient in a filter process in accordance with the scale, the phase information for each pixel of interest, and a phase information control parameter (low-pass coefficient) used to control frequency characteristics of a filter; and filter processing means for executing the filter process of input image data by a convolution operation on the basis of the calculated filter coefficient, and outputting multi-valued image data.

According to one aspect of the present invention, there is provided a processing method for an image processing apparatus for scaling input image data, and outputting the scaled image data, comprising the steps of; determining phase information, which indicates distances between a position of a pixel of interest after scaling, and neighboring pixels of an original image, for each pixel of interest after scaling; calculating a filter coefficient in a filter process in accordance with a scale, a phase information control parameter (low-pass coefficient) used to control frequency characteristics of a filter, and the determined phase information; and executing the filter process of input image data by a convolution operation on the basis of the calculated filter coefficient, and outputting multi-valued image data.

According to one aspect of the present invention, there is provided a program for making a computer function as; means for designating a scale; phase information determination means for determining phase information, which indicates distances between a position of a pixel of interest after scaling, and neighboring pixels of an original image, for each pixel of interest after scaling; coefficient arithmetic means for calculating a filter coefficient in a filter process in accordance with the scale, the phase information for each pixel of interest, and a phase information control parameter (low-pass coefficient) used to control frequency characteristics of a filter; and filter processing means for executing the filter process of input image data by a convolution operation on the basis of the calculated filter coefficient, and outputting multi-valued image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 18 is a graph showing the frequency characteristics when LC=1.3 and phase=½ pixel.

DETAILED DESCRIPTION OF THE PREFERRED EMBODIMENT

A preferred embodiment of the present invention will be described in detail hereinafter with reference to the accompanying drawings.

[Image Controller Unit]

Figure 1:
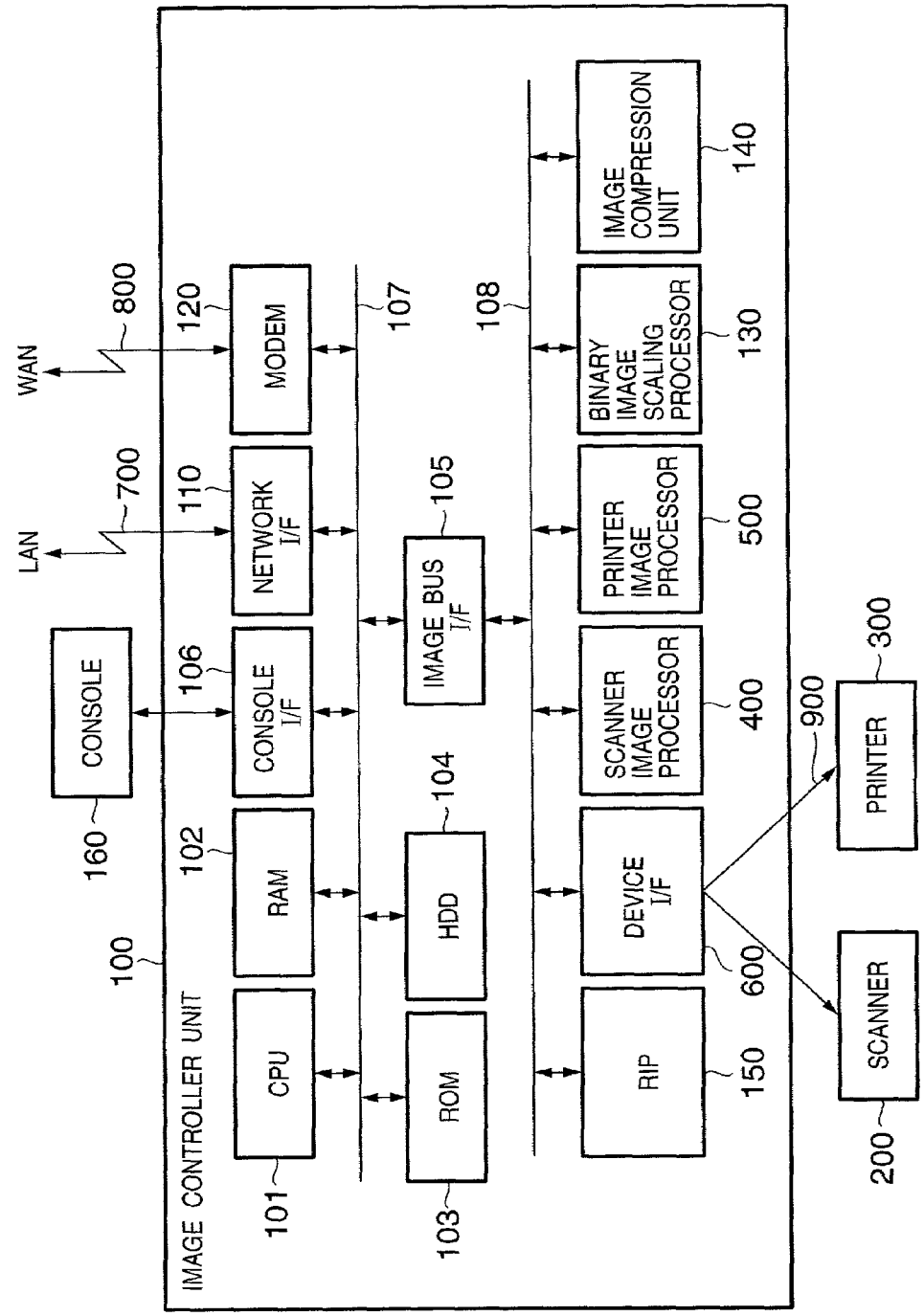
FIG. 1 is a block diagram showing the arrangement of an image controller unit according to an embodiment of the present invention.

FIG. 1 is a block diagram showing the arrangement of an image controller unit according to this embodiment. As shown in FIG. 1, an image controller unit 100 of this embodiment is a controller for inputting/outputting image information and device information, as it is connected to a scanner 200 as an example of an image input device, and a printer 300 as an example of an image output device, and also to a LAN 700 and public line (WAN) 800.

In the image controller unit 100, reference numeral 101 denotes a CPU for controlling the entire system in accordance with a program stored in a ROM (to be described later). Reference numeral 102 denotes a RAM which is a memory on which a system work memory used when the CPU 101 executes processes, and an image memory used to temporarily store image data are assured. Reference numeral 103 denotes a ROM which stores a boot program of the system, and various processing programs or control data. Reference numeral 104 denotes a hard disk drive (HDD), which stores system software and image data. Reference numeral 106 denotes a console I/F, which serves as an interface with a console 160, and outputs image data to be displayed on the console 160 to it. Also, the console I/F 106 sends information input by the user at the console 160 to the CPU 101. Reference numeral 110 denotes a network I/F which is connected to the network (LAN) 700 to input/output information. Reference numeral 120 denotes a modem which is connected to the public line (WAN) 800 to input/output information. These devices are connected to a system bus 107.

Reference numeral 105 denotes an image bus I/F, which is a bus bridge that connects the aforementioned system bus 107 and an image bus 108 that transfers image data at high speed, and converts a data structure. The image bus 108 comprises a high-speed bus such as a PCI bus or the like. The following devices are connected to the image bus 108.

Reference numeral 150 denotes a raster image processor (RIP), which rasterizes page description language (PDL) codes sent from a personal computer (PC; not shown) or the like to a bitmap image. Reference numeral 600 denotes a device I/F, which connects the scanner 200 and printer 300 as image input/output devices, and the image controller unit 100 to convert the synchronous system/asynchronous system of image data. Reference numeral 400 denotes a scanner image processor for correcting, processing, and editing input image data. Reference numeral 500 denotes a printer image processor for executing, e.g., a smoothing process of print output image data to smooth character edges. Reference numeral 130 denotes a binary image scaling processor, which is a processing module as a characteristic feature of this embodiment, and its detailed processing contents will be explained later. Basically, the binary image scaling processor 130 inputs binary image data, executes scaling, and outputs binary image data. Reference numeral 140 denotes an image compression unit for executing a JPEG compression/expansion process of multi-valued image data, and a JBIG, MMR, or MH compression/expansion process of binary image data.

The aforementioned HDD 104 saves information indicating the image output speed, location, and the like of each node connected to the network (LAN) 700 for each address.

[Image Input Device (Scanner)]

Figure 2:
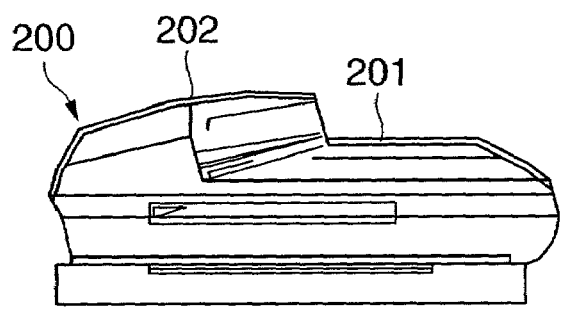
FIG. 2 is a perspective view showing the outer appearance of an image input device of the embodiment.

FIG. 2 is a perspective view showing the outer appearance of the image input device of this embodiment. As shown in FIG. 2, the scanner 200 as an image input device illuminates an image on a paper sheet as a document with light, and scans a CCD line sensor (not shown) to convert that image into an electrical signal as raster image data. When the user sets document sheets on a tray 202 of a document feeder 201 and inputs a scan start instruction at the console 160, the CPU 101 of the image controller unit 100 sends the start instruction to the scanner 200 via the device I/F 600, and the feeder 201 of the scanner 200 feeds document sheets one by one to scan document images.

[Image Output Device (Printer)]

Figure 3:
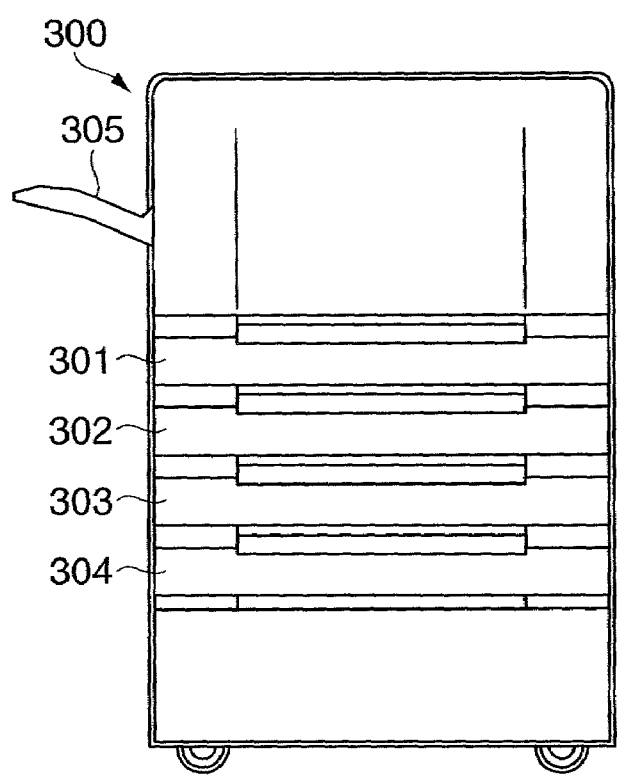
FIG. 3 is a perspective view showing the outer appearance of an image output device of the embodiment.

FIG. 3 is a perspective view showing the outer appearance of the image output device of this embodiment. As shown in FIG. 3, the printer 300 as an image output device converts raster image data into a visible image on a paper sheet. As the system of the printer 300, an electrophotography system that uses a photosensitive drum, photosensitive belt, or the like, an ink-jet system for directly printing an image on a paper sheet by ejecting ink from a micro-nozzle array, and the like are available, and any of these systems may be used. The print operation starts when the CPU 101 of the image controller unit 100 issues an instruction via the device I/F 600. The printer 300 has a plurality of paper feed stages that allow the user to select different paper sizes or directions, and paper cassettes 301, 302, 303, and 304 corresponding to these sizes or directions are prepared. An exhaust tray 305 receives paper sheets that have undergone the print process.

[Scanner Image Processor]

Figure 4:
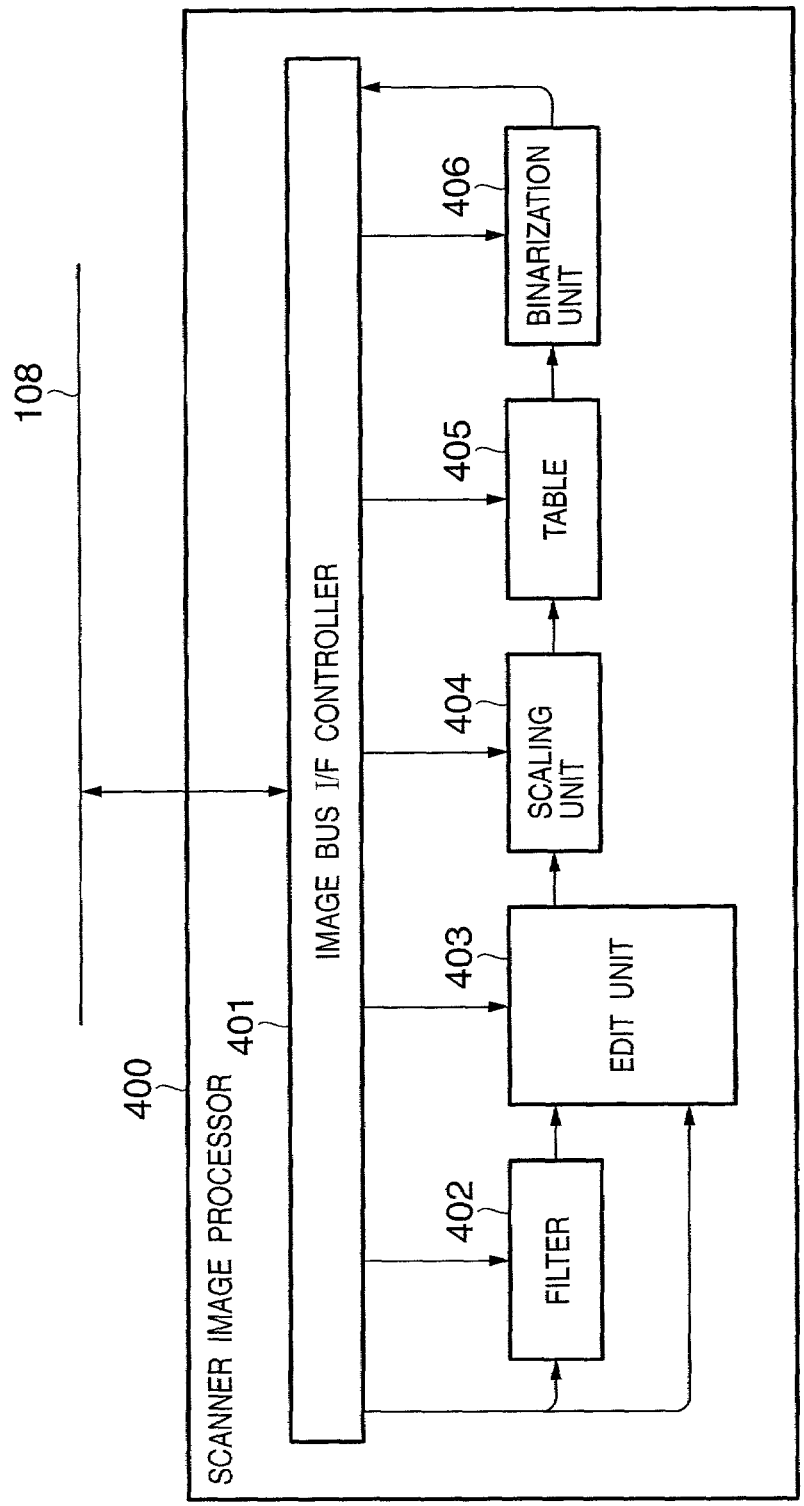
FIG. 4 is a block diagram showing the arrangement of a scanner image processor 400 shown in FIG. 1.

FIG. 4 shows the arrangement of the scanner image processor 400 shown in FIG. 1. Referring to FIG. 4, reference numeral 401 denotes an image bus I/F controller which is connected to the image bus 108, and has a function of controlling an access sequence to the image bus 108. Also, the image bus I/F controller 401 controls respective devices in the scanner image processor 400, and generates timings for these devices. Reference numeral 402 denotes a filter processor for making convolution operations using a spatial filter. Reference numeral 403 denotes an edit unit which, for example, recognizes a closed region bounded by a marker pen from input image data, and executes an image process such as shadow-casting, hatching, negative/positive reverse, and the like. Reference numeral 404 denotes a scaling unit for making interpolation operations in the main scan direction of a raster image to attain scaling when the resolution of the scanned image is to be changed. Scaling in the sub-scan direction is attained by changing the scan speed of an image scan line sensor (not shown). Reference numeral 405 denotes a table used to convert scanned image data as luminance data into density data. Reference numeral 406 denotes a binarization unit for binarizing multi-valued, grayscale image data by, e.g., an error diffusion or screen process.

Image data that has undergone the aforementioned processes is transferred onto the image bus 108 again via the image bus I/F controller 401.

[Printer Image Processor]

Figure 5:
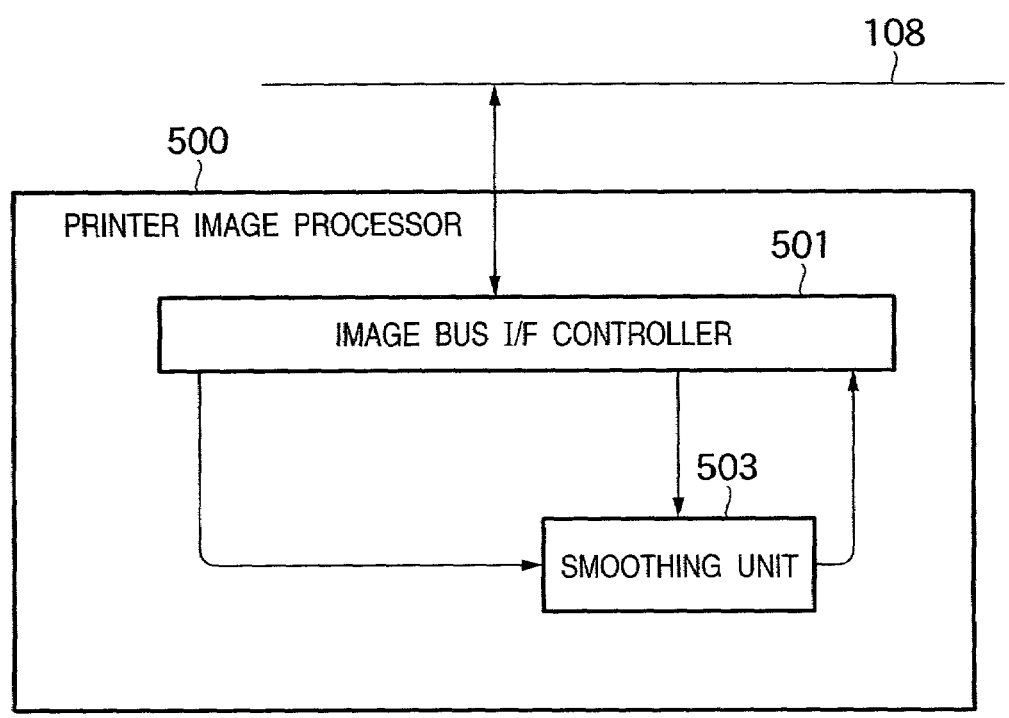
FIG. 5 is a block diagram showing the arrangement of a printer image processor 500 shown in FIG. 1.

FIG. 5 shows the arrangement of the printer image processor 500 shown in FIG. 1. Referring to FIG. 5, reference numeral 501 denotes an image bus I/F controller which is connected to the image bus 108 and has a function of controlling an access sequence to the image bus 108. Also, the image bus I/F controller 501 controls respective devices in the printer image processor 500 and generates timings for these devices. Reference numeral 503 denotes a smoothing processor for executing a process for smoothing jaggy (noise of an image that appears at a black/white boundary portion such as an oblique line or the like) of image data after resolution conversion.

[Binary Image Scaling Processor]

Figure 6:
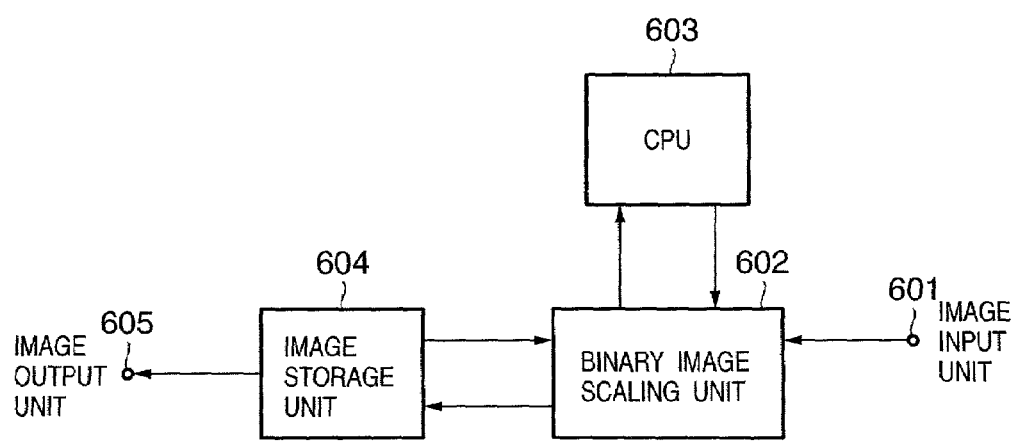
FIG. 6 is a simple block diagram for explaining the process of a binary image scaling processor 130 shown in FIG. 1.

FIG. 6 is a simple block diagram for explaining the process of the binary image scaling processor 130 shown in FIG. 1. Referring to FIG. 6, reference numeral 601 denotes an image input unit; 602, a binary image scaling unit; 603, a CPU; 604, an image storage unit; and 605, an image output unit. FIG. 6 shows the connection relationship among blocks which are extracted from those in FIG. 1 for the sake of easy understanding. Note that the image input unit 601 may receive image data input from the scanner 200 as a source device via the device I/F 600, may receive image data from the network I/F 110 or modem 120 via the LAN 700 or WAN 800, or may receive image data stored in a storage device such as the HDD 104, RAM 102, or the like.

The binary image scaling unit 602 shown in FIG. 6 corresponding to the binary image scaling processor 130 shown in FIG. 1. The CPU 603 corresponds to the CPU 101, and the image storage unit 604 corresponds to devices for storing images such as the HDD 104, RAM 102, and the like, any one of which may be used as long as they can be accessed by the binary image scaling unit 602. The image output unit 605 represents the output from the image storage unit 604, and outputs image data to the print image processor 500 if an image is to be printed, to the storage device such as the HDD 104, RAM 102, or the like if the image data is to be stored in another storage device, or to the modem 120 or network I/F 110 if the image data is to be transferred via FAX or the network.

In the arrangement shown in FIG. 6, image data from the image input unit 601, and the scale from the CPU 603 are respectively input to the binary image scaling unit 602. Note that the binary image scaling unit 602 is scaling processing means which can independently control the scale and low-pass filter characteristics. Also, the low-pass filter characteristics to be obtained change in correspondence with the scale. In general, as the scale becomes smaller, band limitation at lower frequencies is required. That is, the binary image scaling unit 602 of this embodiment scales an image using a filter coefficient corresponding to the scale input from the CPU 603, and outputs the image as binary image data to the image storage unit 604.

Figure 7:
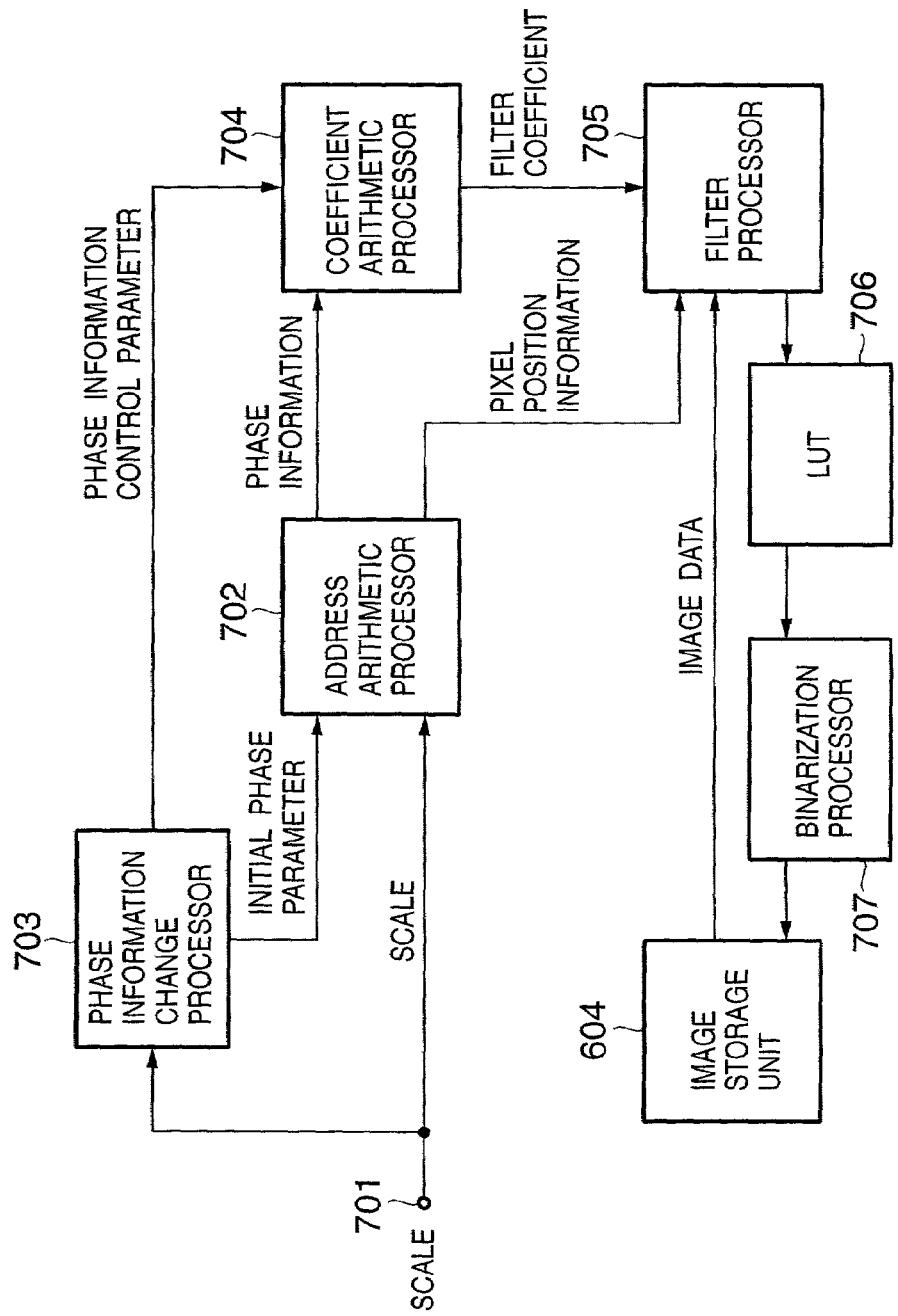
FIG. 7 is a block diagram showing the detailed arrangement of an image scaling unit 602 shown in FIG. 6.

FIG. 7 is a block diagram showing the detailed arrangement of the binary image scaling unit 602 shown in FIG. 6. Referring to FIG. 7, reference numeral 701 denotes a scale input unit which inputs the scale from the CPU 603. Reference numeral 702 denotes an address arithmetic processor which receives the scale from the scale input unit 701 and an initial phase parameter from a phase information change processor (to be described later), and makes address operations by shifting the pixel position of an output image for each pixel. More specifically, the address arithmetic processor 702 computes a pixel position on an original image, which corresponds to the pixel of interest on an output image, calculates a difference within one pixel from a nearly pixel on the original image as phase information, outputs that phase information to a coefficient arithmetic processor (to be described later), and outputs the pixel position information of the original image to a filter processor (to be described later).

Reference numeral 703 denotes a phase information change processor, which outputs a phase information control parameter to the coefficient arithmetic processor (to be described below) in accordance with the scale from the scale input unit 701, and outputs an initial phase parameter to the address arithmetic processor 702 in accordance with that scale. Reference numeral 704 denotes a coefficient arithmetic processor, which receives phase information from the address arithmetic processor 702 and a phase information control parameter from the phase information change processor 703, calculates the distance between each of 8×8 pixels of the original image located near the pixel of interest, and the pixel of interest, and computes a filter coefficient used in a filter process in accordance with the calculated distances and phase information control parameter. After that, the coefficient arithmetic processor 704 sets the filter coefficient of each pixel in a filter processor 705.

Image data is input from the image data input unit 601 shown in FIG. 6. In the example shown in FIG. 7, the image storage unit 604 pre-stores an original image to be processed, and 8×8 pixel data of the original image are read out from the image storage unit to the filter processor (to be described below) on the basis of the pixel position information from the address arithmetic processor 702.

Reference numeral 705 denotes a filter processor which receives 8×8 pixel data of the original image from the image storage unit 604 on the basis of the pixel position information from the address arithmetic processor 702, makes convolution operations on the basis of the filter coefficient from the coefficient arithmetic processor 704, and outputs multi-valued image data. Reference numeral 706 denotes an LUT (lookup table), which receives multi-valued image data from the filter processor 705, and outputs an output value corresponding to a level by looking up the table. Reference numeral 707 denotes a binarization processor, which binarizes the output result from the LUT 706, and outputs binary image data to the image storage unit 604.

As described above, the binary image scaling unit 602 receives binary image data, binarizes multi-valued image data that has undergone scaling in accordance with the scale, and outputs binary image data.

Therefore, according to this embodiment, since binary image data is output without spooling multi-valued image data in an intermediate state, the use size of the image storage unit 604 and the image transfer size can be minimized.

In this embodiment, a filter size of 8×8 will be exemplified. However, different sizes may be set in the main scan and sub-scan directions, and the size is not limited to "8" but can be arbitrarily set.

The scaling process of the binary image scaling unit 602 will be described in detail below. In the following description, assume that the same phase information control parameters, initial phase parameters, scales, and the like are used in the main scan and sub-scan directions for the sake of simplicity. However, it is easy for those who are skilled in the art to execute this process using different parameters in the main scan and sub-scan directions.

In the following description, assume that main scan and sub-scan scales input from the scale input unit 701 are 50%. In accordance with these scales, the phase information change processor 703 calculates a phase information control parameter LC (low-pass coefficient) by:

$$LC=1.5+(100/RPX(RPY)-1)\times 0.5$$

where RPX (RPY) is the scale in the main scan (sub-scan) direction. Since both the main scan and sub-scan scales are 50%, LC=2 in this case.

LC (low-pass coefficient) is output to and used by the coefficient arithmetic processor 704 so as to control the frequency characteristics of a low-pass filter. In this embodiment, LC is changed in accordance with the scales on the basis of the above equation. However, the present invention is not limited to such specific example. That is, LC can be changed continuously so that a change in LC does not influence an image, upon changing LC in accordance with the scales. How to use LC will be explained later.

The phase information change processor 703 calculates initial phase parameters in accordance with the scales. For example, this embodiment uses a rule that if each scale is a fraction of an integer, an initial phase parameter IX (IY) is set to be 0.5; otherwise, the parameter is zero. This rule will be explained in more detail later.

In this embodiment, since each scale is ½=50%, the initial phase parameter IX=IY=0.5. The initial phase parameters are similarly set when the scale is ⅓≈33% and ¼=25%.

When each scale is an integer multiple upon up-scaling, e.g., is 200%, 300%, or the like, each initial phase parameter is set by:

$$IX(IY)=100/RPX(RPY)/2$$

More specifically, when the scale is 200%, IX (IY)=0.25; when it is 300%, IX (IY)≈0.167.

The initial phase parameters IX and IY set in this manner are output to and used by the address arithmetic processor 702.

Note that the address arithmetic processor 702 receives the scale RPX (RPY)=50 and initial phase parameter IX (IY)=0.5, and operates as follows. For example, if the X position of the pixel of interest is X (main scan)=50th pixel and the Y position is Y (sub-scan)=10th pixel, the coordinate position on the original image where the pixel of interest is located can be calculated by:

$$Xo = X/(RPX/100) + IX$$
$$= 50/(50/100) + 0.5$$
$$= 100.5$$

$$Yo = Y/(RPY/100) + IY$$
$$= 10/(50/100) + 0.5$$
$$= 20.5$$

Note that the initial phase parameters are added upon calculating the address, as described above.

Decimal parts PIX=0.5 and PIY=0.5 of Xo and Yo (since this embodiment is designed so that the decimal parts of Xo and Yo assume the same value, the following explanation will be given using one parameter) are output as initial phase parameters to the coefficient arithmetic processor 704, and integral parts OX=100 and OY=20 of Xo and Yo are output as pixel position information of the original image to the N×1 filter processor 705. Upon completion of all processes at the current pixel of interest, the position of the pixel of interest is shifted by one pixel to continue processes.

When the scale RPX (RPY)=50, since the address is always divided by 50/100=0.5, the decimal part PIX remains unchanged from an initial phase IX. For example, when the position of X alone is updated by one pixel like X=51 and Y=10, Xo=102.5 (since the same applies to the update process in the sub-scan direction, a description thereof will be omitted) and, hence, PIX=0.5. Even when X increases by one pixel, Xo always increases by 2, and PIX=0.5 remains the same.

However, such case is an exception. In general, every time the position of the pixel of interest is shifted by one pixel, the value of PIX (PIY) changes, and a filter coefficient value used in the interpolation operation changes for each pixel due to the change in PIX (PIY). For example, if the scale RP=80, and the initial phase parameter=0, as described above, when $X = 50$,
$$Xo = 50/(80/100) + 0$$
$$= 62.5, \text{ and } PI = 0.5,$$

when $X = 51$,
$$Xo = 51/(80/100) + 0$$
$$= 63.75, \text{ and } PI = 0.75,$$

when $X = 52$,
$$Xo = 52/(80/100) + 0$$
$$= 65.0, \text{ and } PI = 0$$

In this manner, when X (or Y) is updated, the value of PIX (PIY) is also updated.

In this case, the explanation will be continued while RPX=RPY=50.

In this embodiment, the pixel position is shifted by one pixel in the main scan direction in the next process and, hence, X=51st pixel and Y=10th pixel. The maximum pixel values in the main scan and sub-scan directions change depending on the size of the document table of the copying machine, scan resolution, and scale. If the maximum pixel value in the main scan direction is 5000, the process of this embodiment starts from the 0th pixel in the main scan direction, and when the 4999th pixel is reached, the next process advances one pixel in the sub-scan direction. In the above example, when the process progresses to X=4999th pixel and Y=10th pixel, the position of the pixel of interest advances to X=0th pixel and Y=11th pixel in the next process, and the process continues until the maximum value in the sub-scan direction is reached.

The coefficient arithmetic processor 704 receives the phase information control parameter LC from the phase information change processor 703 and phase information PIX from the address arithmetic processor 702, and operates as follows.

Figure 8:
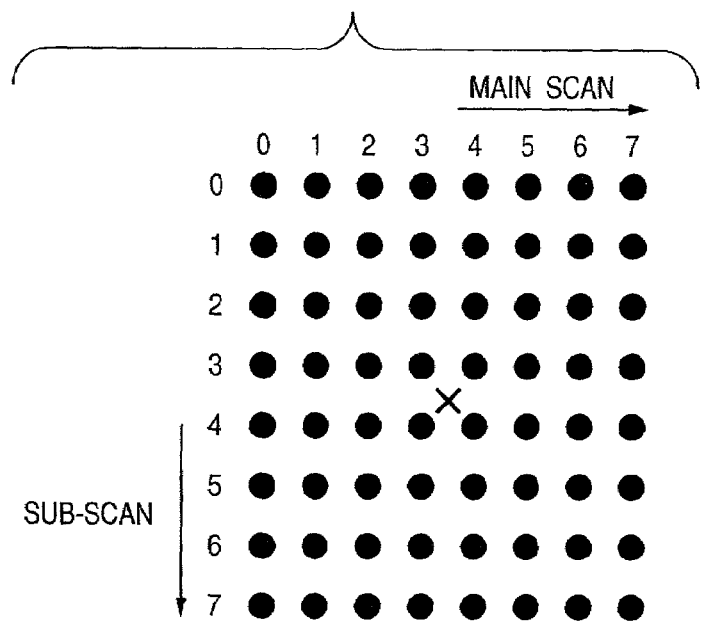
FIG. 8 shows a pixel of interest and pixels on an original image near the pixel of interest.

FIG. 8 shows the pixel of interest, and pixels on the original image near the pixel of interest. In FIG. 8, a mark "X" indicates the pixel of interest, and marks "○" indicate pixels on the original image. Since this embodiment uses an 8×8 filter, only 8×8 pixels on the original image near the pixel of interest are used. The pixel X of interest is set to always fall within the ranges 3≦i<4 and 3≦j<4 of pixels on the original image near the pixel of interest. Also, position information OX and position information OY of the original image output from the address arithmetic processor 702 are set to indicate a position of i=3 and j=3.

Figure 9:
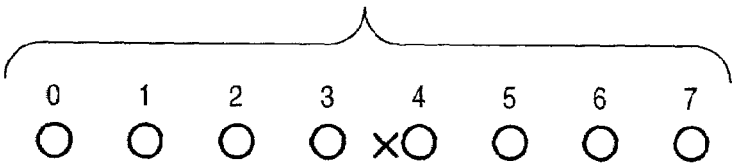
FIG. 9 is a view for explaining a process for obtaining distance in the main scan direction.

The distance between each pixel on the original image near the pixel of interest, and the pixel of interest is independently calculated in the main scan and sub-scan directions. As shown in FIG. 9, pixels are projected in the main scan direction, and distances in the main scan direction are calculated. If AXi (i is an integer ranging from 0 to 7) represents the distance between the i-th pixel and the pixel of interest, we have:

$$AX0=3+PIX$$

$$AX1=2+PIX$$

$$AX2=1+PIX$$

$$AX3=PIX$$

$$AX4=1-PIX$$

$$AX5=2-PIX$$

$$AX6=3-PIX$$

$$AX7=4-PIX$$

Note that the distance between neighboring pixels is 1 in the above calculations, and 0≦PIX (PIY)<1. Distances AY0 to AY7 in the sub-scan direction are similarly calculated.

From the distance information of AX0 to AX7 and AY0 to AY7, and the phase information control parameter LC, an i-th coefficient Ci in the main scan direction, and a j-th coefficient Cj in the sub-scan direction are independently obtained to calculate an (i-th (main scan), j-th (sub-scan)) coefficient Cij=Ci*Cj. In order to explain the effect of this embodiment, the bi-cubic method will be described first.

As an arithmetic formula used to obtain coefficients of a filter, a cubic polynomial approximation of a sinc function well known as the bi-cubic method is used. However, such method is an example to calculate filter coefficients, and the present invention is not limited to this.

In the bi-cubic method, a coefficient C is given by:

$$\text{Coefficient } C = 1 - 2*d*d + d*d*d \quad (1 \le d < 1) \quad (1)$$
$$4 - 8*d + 5*d*d - d*d*d \quad (1 \le d < 2)$$
$$0 \quad (d \ge 2)$$

where d is the distance from the pixel of interest.

Figure 10:
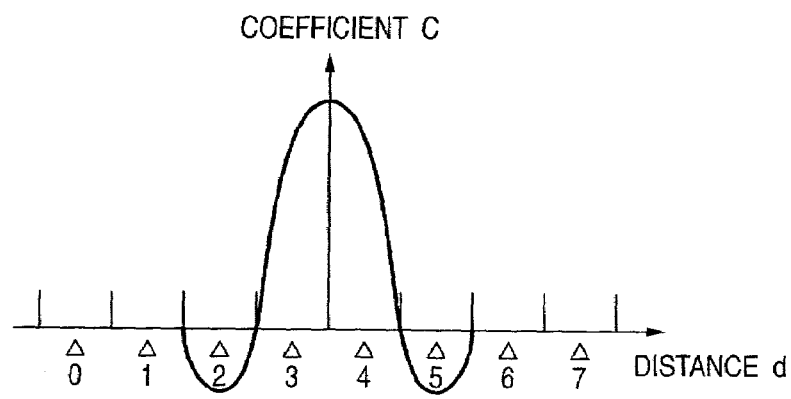
FIG. 10 is a graph showing the relationship between a coefficient C and distance d in the bi-cubic method.

FIG. 10 shows the relationship between the coefficient C and distance d in the bi-cubic method. In the example shown in FIG. 10, Δ indicates the layout of distance information AXi or AYj of this embodiment, and i corresponds to a numeral suffixed to Δ and assumes a value ranging from 0 to 7. The distance d is illustrated to have X shown in FIG. 9 as an origin, around which one graduation indicates unit distance=1. The distance d assumes a positive value even if it is located on the left side of the origin, since it is a distance. More specifically, the position Δ3 is separated PI from the origin, and AX3 (AY3)=PI. The distance between neighboring Δ marks is 1. Hence, AX0 is located at the position Δ0, and AX0=3+PI. A curve in FIG. 10 indicates a change in values of the coefficient C in accordance with the distance d. When i=2 to 5, corresponding coefficients are assigned; when i=0, 1, 6, and 7, the coefficient is zero. That is, in the bi-cubic method, a filter of 4×4 pixels is always used.

Figure 11:
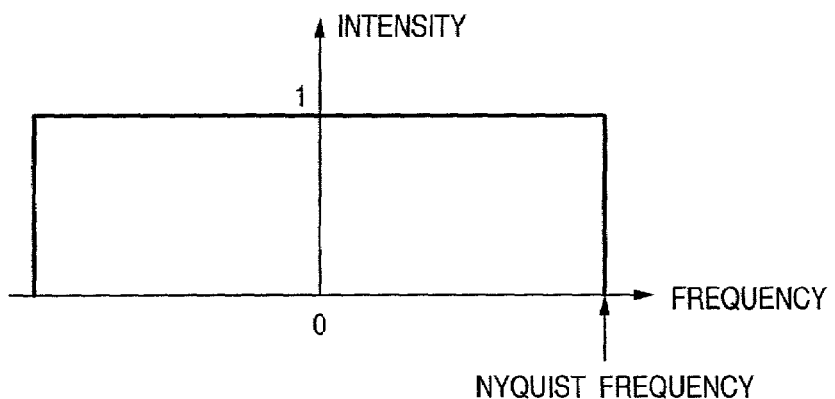
FIG. 11 is a graph showing the frequency characteristics of a sinc function.

FIG. 11 shows the frequency characteristics of the sinc function. Since the polynomial approximation used in the bi-cubic method is an approximation of the sinc function, it is slightly different from the frequency characteristics shown in FIG. 11, but the following explanation will be given under the assumption that the polynomial approximation is equivalent to the characteristics shown in FIG. 11, for the sake of simplicity. As can be seen from FIG. 11, the sinc function is a band-limiting filter. The frequency bands to be limited are those beyond ±½ the frequency of the original image. In general, an image having a frequency band beyond the Nyquist frequency cannot be resolved, and its image quality deteriorates due to generation of moiré.

For example, when an original image has a resolution of 600 dpi, frequency components that exceed 300 dpi are set to be zero. Upon down-scaling, if this arithmetic formula is used, all the frequency bands of the original image are preserved. If the frequency bands of the original image are left upon down-scaling, when the original image contains an image with periodicity, moiré is generated, and causes deterioration of image quality. For example, when 50% down-scaling is done, if an original image contains a screen image of 200 dpi or a print using halftone dots of 200 lines, such image looks as if it have an apparent frequency of 400 dpi. Hence, the frequency exceeds 300 dpi as a resolving limit, and image quality deteriorates due to moiré fringes.

Hence, this embodiment prevents deterioration of image quality due to moiré fringes by changing the phase information in correspondence with the scale.

The process of this embodiment that changes the phase information in correspondence with the scale will be explained below. Normally, since the distance d is that from the pixel of interest, it is given by dXi=AXi (dYj=AYj), but is changed using the phase control parameter LC as follows:

$$dXi=AXi/LC \ (dYj=AYj/LC)$$

LC is changed in correspondence with the scale. For example, if LC=100/RP (scale), LC=2.

When LC=1, $$d=AX0=3.5 \ Ci=0$$

$$d=AX1=2.5 \ Ci=0$$

$$d=AX2=1.5 \ Ci=-0.125$$

$$d=AX3=0.5 \ Ci=0.625$$

$$d=AX4=0.5 \ Ci=0.625$$

$$d=AX5=1.5 \ Ci=-0.125$$

$$d=AX6=2.5 \ Ci=0$$

$$d=AX7=3.5 \ Ci=0$$

When LC=2

$$d=AX0=3.5/2=1.75 \ Ci=-0.047$$

$$d=AX1=2.5/2=1.25 \ Ci=-0.141$$

$$d=AX2=1.5/2=0.75 \ Ci=0.297$$

$$d=AX3=0.5/2=0.5 \ Ci=0.891$$

$$d=AX4=0.5/2=0.5 \ Ci=0.891$$

$d=AX5=1.5/2=0.75\ Ci=0.297$ $d=AX6=2.5/2=1.25\ Ci=-0.141$ $d=AX7=3.5/2=1.75\ Ci=-0.047$

Note that each coefficient is rounded off to three decimal places. It is important that when LC=1, only four central coefficients (i=2 to 5) are used (see FIG. 10); when LC=2, coefficients are assigned to all i=0 to 7, and a lower-frequency range is band-limited.

Figure 12:
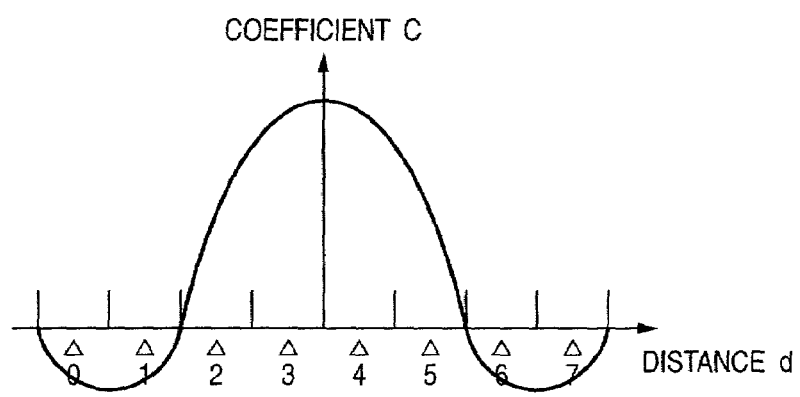
FIG. 12 is a graph showing the relationship between the coefficient C and distance d when LC=2.
Figure 13:
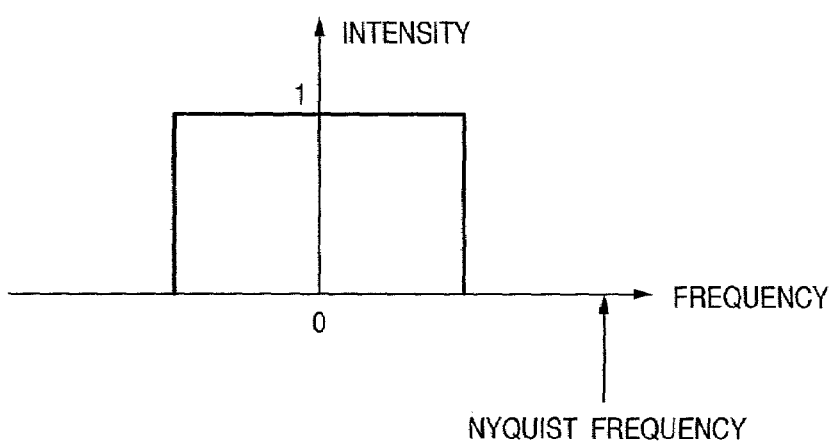
FIG. 13 is a graph showing the frequency characteristics of a filter when LC=2.

FIG. 12 shows the relationship between the coefficient C and distance d when LC=2. FIG. 13 illustrates the frequency characteristics of a filter when LC=2. Note that the actual frequency characteristics do not form such fair rectangle, since the filter is defined by not the sinc function itself but its approximation, and the number of samples is a finite value. However, the characteristics shown in FIG. 13 are approximate to the intended frequency characteristics. As can be seen from FIG. 13, the frequency band can be limited to that half the Nyquist frequency, and deterioration of image quality due to generation of moiré fringes can be suppressed.

Filter coefficients in the sub-scan direction can be calculated in the same manner as those in the main scan direction.

In this embodiment, linear filter coefficients have been exemplified. However, in practice, two-dimensional filter coefficients are calculated as follows to execute a filter process in the filter processor 705:

$$Cij=Ci*Cj$$

That is, the filter processor 704 receives Cij, and sets a filter coefficient at a position corresponding to an address (i-th, j-th) of the 8×8 matrix. By setting 8×8 coefficients, filter operations are made. The filter arithmetic result is normalized by the sum total of Cij (i=0 to 7, j=0 to 7) when it is output. Note that the filter arithmetic result is normalized to 256 values ranging from 0 to 255 in this embodiment.

Note that the filter coefficients are independently calculated in the main scan and sub-scan directions. In practice, since the pixel position information (X, Y) of the original image corresponds to (i=3, j=3), 8×8 pixel data ranging from (X−3, Y−3) to (X+4, Y+4) of the original image are picked up to make convolution operations.

The filter processor 705 picks up 8×8 pixel data of the original image to be processed from the image storage unit 604 on the basis of the pixel position information from the address arithmetic processor 702, makes convolution operations based on filter coefficients, and outputs multi-valued image data. The multi-valued image data is input to the LUT 706, which changes the level of the image data in correspondence with the density characteristics of the printer 300 (FIG. 1) as the output means, i.e., desired density characteristics.

Figure 14:
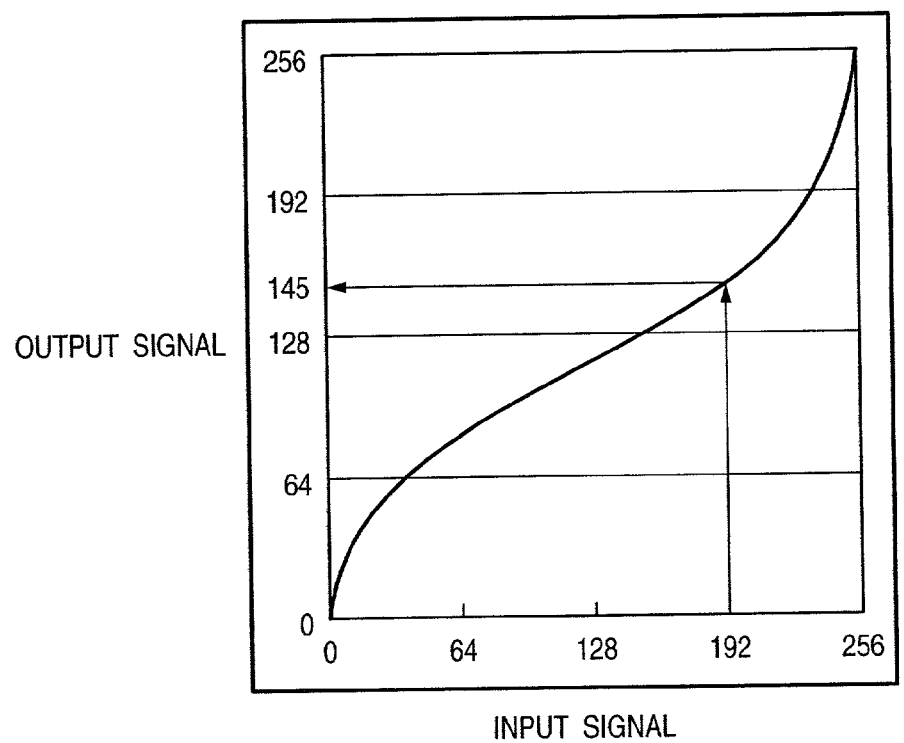
FIG. 14 is a graph showing the input/output characteristics of an LUT 706 of the embodiment.

FIG. 14 shows the input/output characteristics of the LUT 706 of this embodiment. As shown in FIG. 14, if an input signal of a multi-valued image has level "192", the LUT outputs an output signal of level "145". Therefore, the aforementioned table is generated and set based on the density characteristics of an input signal and those upon printing an output signal, thus allowing density correction.

The multi-valued image data output from the LUT 706 is binarized by the binarization processor 707, and is output to the image storage unit 604 as binary image data.

As described above, according to this embodiment, after a binary image is input and is scaled, a binary image is output. Hence, the image storage size and image transfer size can be reduced to ⅛ of a multi-valued image to be temporarily output, thus attaining resource savings.

In the above example, a binary image is input. However, the present invention can be applied to a case wherein a multi-valued image is input.

[Second Embodiment]

The second embodiment of the present invention will be described in detail hereinafter with reference to the accompanying drawings.

Normally, if LC (low-pass coefficient) is not selected, interference fringes (moiré) which are not observed on a document are likely to be generated in case of a binary image. Especially, such phenomenon is conspicuous when scaling is done at a scale near 100%. This is because the frequency characteristics change largely due to a change in phase when the low-pass coefficient LC=1. In the second embodiment, a method of solving such problem will be explained.

In the first embodiment mentioned above, the difference of the frequency characteristics has been explained taking low-pass filters when LC=1 and 2 as an example. The frequency characteristics of a low-pass filter formed by the value LC and phase will be explained in more detail below.

FIGS. 15 to 18 are graphs of frequency response characteristics according to respective low-pass coefficients and phases when one pixel is 600 dpi. In FIGS. 15 to 18, the abscissa plots frequencies (dpi) up to 300 dpi as half (Nyquist frequency) the spatial frequency of an image, and the ordinate plots power.

Figure 15:
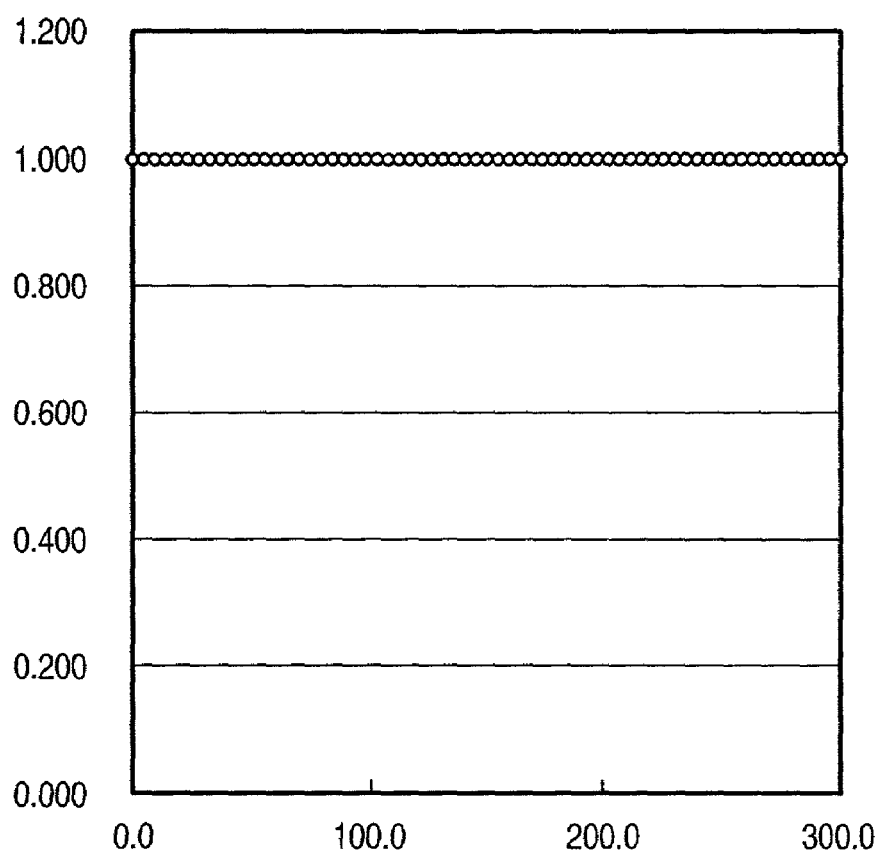
FIG. 15 is a graph showing the frequency characteristics when LC=1 and phase=zero pixel.
Figure 16:
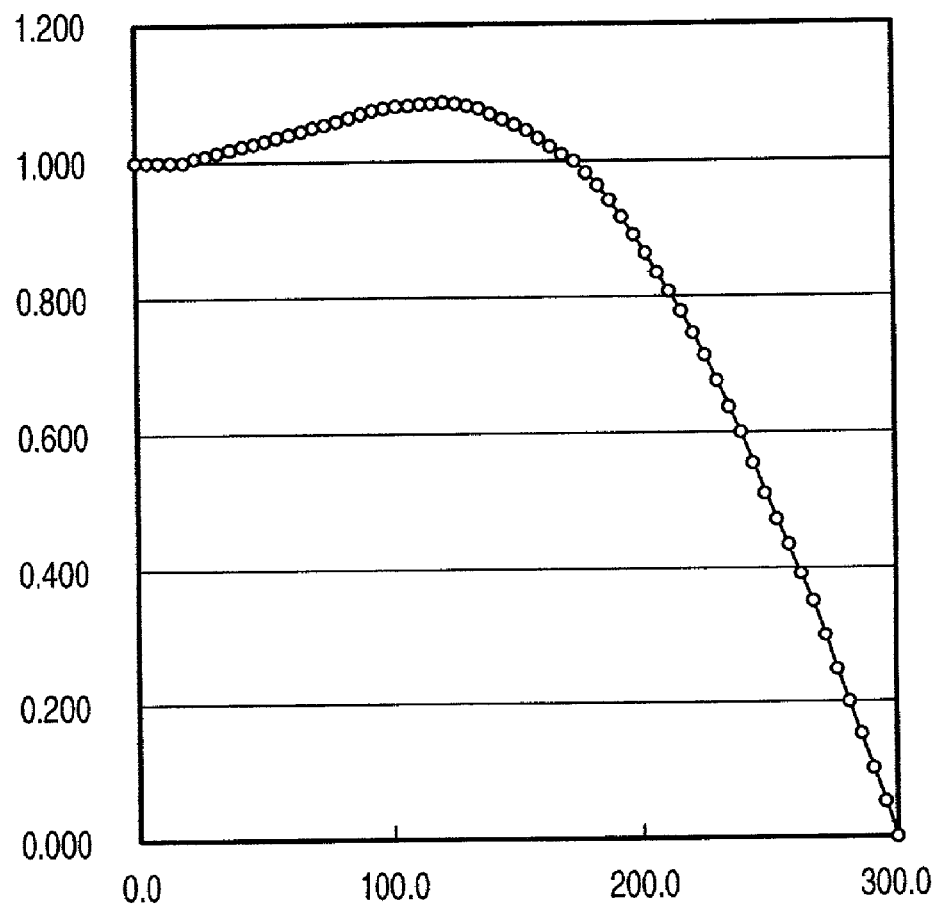
FIG. 16 is a graph showing the frequency characteristics when LC=1 and phase=½ pixel.

FIG. 15 shows the frequency characteristics of a filter when LC=1 and phase=zero pixel. FIG. 16 shows the frequency characteristics of a filter when LC=1 and phase=½ pixel. When phase=½, the frequency characteristics most separated from those when phase=0 are formed. When phase changes from ½ to 1, the frequency characteristics approach those formed when phase=0. Hence, the frequency characteristics of other phases form curves that pass between FIGS. 15 and 16. In this manner, when the frequency characteristics vary for respective phases, if a binary image is input, periodic density nonuniformity is generated even when it is a document having no periodicity. Especially, when the scale is near 100%, since density nonuniformity is generated at a long period, it is very conspicuous. When the phase approaches 0 or 1, the resolution hardly lowers, as indicated by the frequency characteristics of FIG. 15. When the phase approaches ½ pixel, the frequency characteristics shown in FIG. 16 are obtained, and the resolution lowers compared to FIG. 15.

Since the first embodiment has been explained using the scale=50%, the phase remains unchanged from 0.5 pixel as an initial phase. However, at other scales, the phase value, which is computed by the address arithmetic means based on the pixel of interest which undergoes scaling, varies for respective pixels of interest. For example, if the scale is 99%, the phase returns to an initial phase at a 99-pixel period. For this reason, filter coefficients with different frequency characteristics are repeated at 99-pixel periods, and conspicuous density nonuniformity with a long period is formed.

For reference, distances d and coefficients AXn (the same applies to AYn) (n=0 to 7) of pixels 0 to 7 of an original image when LC=1 and phase=0 and 0.5 pixel are listed:

When LC=1 and phase=zero pixel, $d=AX0=3\ Ci=0$ $d=AX1=2\ Ci=0$ d=AX2=1 Ci=0 d=AX3=0 Ci=1 d=AX4=0 Ci=0 d=AX5=1 Ci=0 d=AX6=2 Ci=0 d=AX7=3 Ci=0

When LC=1 and phase=½ pixel, d=AX0=3.5 Ci=0 d=AX1=2.5 Ci=0

$d=AX2$=1.5 $Ci$=−0.125 d=AX3=0.5 Ci=0.625 d=AX4=0.5 Ci=0.625

$d=AX5$=1.5 $Ci$=−0.125 d=AX6=2.5 Ci=0 d=AX7=3.5 Ci=0

To prevent such phenomenon, LC is always set to be equal to or larger than 1.3 in this embodiment.

Figure 17:
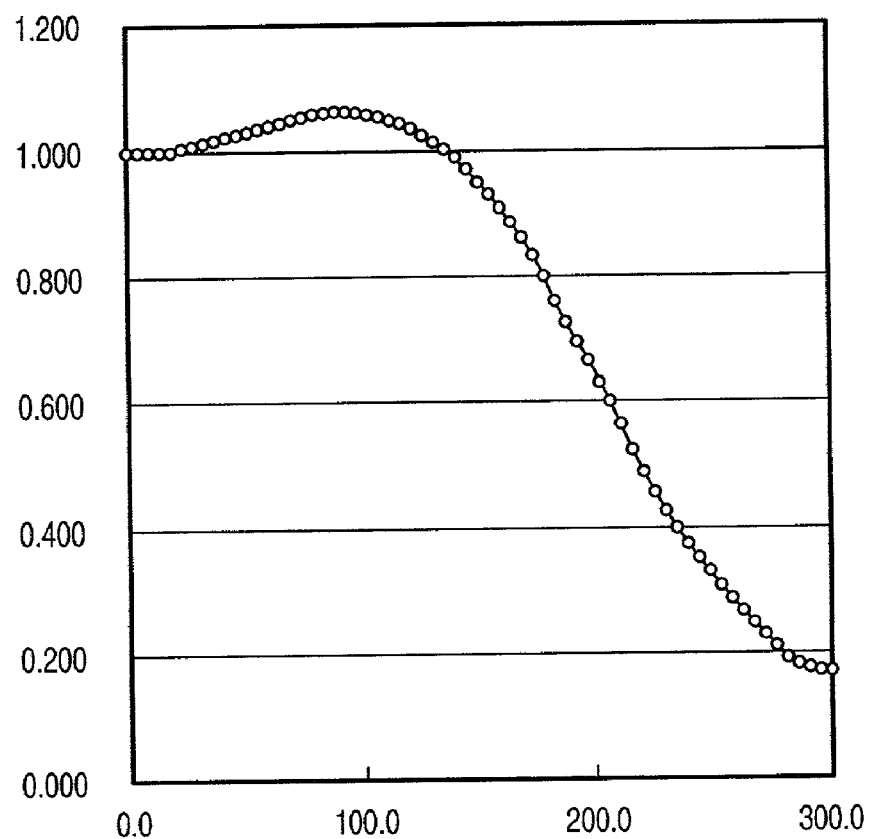
FIG. 17 is a graph showing the frequency characteristics when LC=1.3 and phase=zero pixel.

FIG. 17 shows the frequency characteristics when LC=1.3 and phase=zero pixel. FIG. 18 shows the frequency characteristics when LC=1.3 and phase=½ pixel. As can be seen from FIGS. 17 and 18, nearly approximate frequency characteristics are obtained irrespective of phase, unlike the frequency characteristics shown in FIGS. 15 and 16. That is, when the value of LC is set to be equal to or larger than 1.3, a low-pass filter effect can be obtained to lower frequencies, and the frequency characteristic difference depending on phases can be minimized, thus suppressing the aforementioned problem.

For reference, distances d and coefficients AXn (the same applies to AYn) (n=0 to 7) of pixels 0 to 7 of an original image when LC=1.3 and phase=0 and 0.5 pixel are listed:

When LC=1.3 and phase=zero pixel, d=AX0=3 Ci=0

$d=AX1$=2 $Ci$=−0.11 d=AX2=1 Ci=0.27 d=AX3=0 Ci=1 d=AX4=0 Ci=0.27

$d=AX5$=1 $Ci$=−0.11 d=AX6=2 Ci=0 d=AX7=3 Ci=0

When LC=1 and phase=½ pixel, d=AX0=3.5 Ci=0

$d=AX1$=2.5 $Ci$=−0.01 d=AX2=1.5 Ci=−0.11

$d=AX3$=0.5 $Ci$=0.76 d=AX4=0.5 Ci=0.76

$d=AX5$=1.5 $Ci$=−0.11

$d=AX6$=2.5 $Ci$=−0.01

$d=AX7$=3.5 $Ci$=0

According to the second embodiment, when LC (low-pass coefficient) is set to be equal to or larger than 1.3, approximate frequency characteristics can be obtained irrespective of phases, and the aforementioned problem can be solved. In other words, occurrence of the aforementioned problem can be sufficiently reduced as long as the power difference at the Nyquist frequency is within 20% in the frequency characteristics of a low-pass filter for each phase, as shown in FIGS. 17 and 18.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

In the above embodiments, the binary image processor 602 is implemented by hardware. However, the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the above embodiments, since the filter process is done in accordance with the scale, phase information for each pixel of interest, and phase information control parameter (low-pass coefficient) used to control the frequency characteristics of a filter, a scaling process of a high-quality binary image can be done without excessively lowering the resolution while suppressing generation of a periodic stripe pattern such as moiré or the like.

As many apparently widely different embodiments of the present invention can be made without departing from the spirit and scope thereof, it is to be understood that the invention is not limited to the specific embodiments thereof except as defined in the appended claims.

What the invention claimed is:

1. An image processing apparatus for scaling input image data, and outputting the scaled image data, comprising:

means for designating a scale phase information determination means for determining phase information, which indicates distances between a position of a pixel of interest after scaling, and neighboring pixels of an original image, for each pixel of interest after scaling;

coefficient arithmetic means for calculating a filter coefficient in a filter process in accordance with the scale, the phase information for each pixel of interest, and a phase information control parameter (low-pass coefficient) used to control frequency characteristics of a filter; and filter processing means for executing the filter process of input image data by a convolution operation on the basis of the. calculated filter coefficient, and outputting multi-valued image data, wherein said coefficient arithmetic means calculates the distances between the pixels of the original image and the position of the pixel of interest after scaling on the original image, which are used in the convolution operation, as distances projected in main scan and sub-scan directions on the basis of the original image pixel position and the phase information, said coefficient arithmetic means has one each of main scan and sub-scan phase information control parameters (low-pass coefficients) used to control the frequency characteristics of the filter, and said coefficient arithmetic means calculates filter coefficients in the main scan and sub-scan directions by a bi-cubic method using the distances changed according to the low-pass coefficients as parameters.

2. The apparatus according to claim 1, wherein the distances between the pixels of the original image and the pixel of interest after scaling, which are used in the convolution operation, are changed by dividing the distances projected in the main scan and sub-scan directions by the low-pass coefficients, and the low-pass coefficients are set to be not less than 1.3.

3. The apparatus according to claim 2, wherein power differences at frequencies 1/2 of input frequencies of the filter coefficients for all pieces of phase information fall within 20%.

4. The apparatus according to claim 1, wherein the scale is nearly equal to 100%.

5. The apparatus according to claim 1, further comprising conversion means for converting a density of the output multi-valued image data in accordance with density characteristics of output means.

6. The apparatus according to claim 5, wherein said conversion means comprises a lookup table, and converts to obtain an output result which linearly changes with respect to the density.

7. The apparatus according to claim 1, further comprising binarization processing means for binarizing the output multi-valued image data.

8. A processing method for an image processing apparatus for scaling input image data, and outputting the scaled image data, comprising the steps of:

determining phase information, which indicates distances between a position of a pixel of interest after scaling, and neighboring pixels of an original image, for each pixel of interest after scaling;

calculating a filter coefficient in a filter process in accordance with a scale, a phase information control parameter (low-pass coefficient) used to control frequency characteristics of a filter, and the determined phase information; and executing the filter process of input image data by a convolution operation on the basis of the calculated filter coefficient, and outputting multi-valued image data, wherein the step of calculating the filter coefficient includes the steps of:

calculating the distances between the pixels of the original image and the position of the pixel of interest after scaling on the original image, which are used in the convolution operation, as distances projected in main scan and sub scan directions on the basis of the original image pixel position and the phase information;

having one each of main scan and sub scan phase information control parameters (low pass coefficients) used to control the frequency characteristics of the filter; and calculating filter coefficients in the main scan and sub scan directions by a bi cubic method using the distances changed according to the low pass coefficients as parameters.

9. The method according to claim 8, wherein the distances between the pixels of the original image and the pixel of interest after scaling, which are used in the convolution operation, are changed by dividing the distances projected in the main scan and sub-scan directions by the low-pass coefficients, and the low-pass coefficients are set to be not less than 1.3.

10. The method according to claim 9, wherein power differences at frequencies 1/2 of input frequencies of the filter coefficients for all pieces of phase information fall within 20%.

11. The method according to claim 8, wherein the scale is nearly equal to 100%.

12. The method according to claim 8, further comprising the step of converting a density of the output multi-valued image data in accordance with density characteristics of output means.

13. The method according to claim 12, wherein the step of converting comprises a lookup table, and includes the step of converting to obtain an output result which linearly changes with respect to the density.

14. The method according to claim 8, further comprising the step of binarizing the output multi-valued image data.

15. A computer executable program recorded on a computer readable medium for making a computer function as an image processing apparatus for scaling input image data, and outputting the scaled image data, the computer executable program comprising:

means for designating a scale;

phase information determination means for determining phase information, which indicates distances between a position of a pixel of interest after scaling, and neighboring pixels of an original image, for each pixel of interest after scaling;

coefficient arithmetic means for calculating a filter coefficient in a filter process in accordance with the scale, the phase information for each pixel of interest, and a phase information control parameter (low-pass coefficient) used to control frequency characteristics of a filter; and filter processing means for executing the filter process of input image data by a convolution operation on the basis of the calculated filter coefficient, and outputting multi-valued image data, wherein said coefficient arithmetic means calculates the distances between the pixels of the original image and the position of the pixel of interest after scaling on the original image, which are used in the convolution operation, as distances projected in main scan and sub-scan directions on the basis of the original image pixel position and the phase information, said coefficient arithmetic means has one each of main scan and sub-scan phase information control parameters (low pass coefficients) used to control the frequency characteristics of the filter, and said coefficient arithmetic means calculates filter coefficients in the main scan and sub-scan directions by a bi-cubic method using the distances changed according to the low pass coefficients as parameters.

16. A computer readable recording medium that records computer executable program for making a computer function as an image processing apparatus for scaling input image data, and outputting the scaled image data, the computer executable program comprising:

means for designating a scale;

phase information determination means for determining phase information, which indicates distances between a position of a pixel of interest after scaling, and neighboring pixels of an original image, for each pixel of interest after scaling;

coefficient arithmetic means for calculating a filter coefficient in a filter process in accordance with the scale, the phase information for each pixel of interest, and a phase information control parameter (low-pass coefficient) used to control frequency characteristics of a filter; and filter processing means for executing the filter process of input image data by a convolution operation on the basis of the calculated filter coefficient, and outputting multi-valued image data, wherein said coefficient arithmetic means calculates the distances between the pixels of the original image and the position of the pixel of interest after scaling on the original image, which are used in the convolution operation, as distances projected in main scan and sub-scan directions on the basis of the original image pixel position and the phase information, said coefficient arithmetic means has one each of main scan and sub-scan phase information control parameters (low-pass coefficients) used to control the frequency characteristics of the filter, and said coefficient arithmetic means calculates filter coefficients in the main scan and sub-scan directions by a bi-cubic method using the distances chained according to the low-pass coefficients as parameters.

* * * * *

UNITED STATES PATENT AND TRADEMARK OFFICE
CERTIFICATE OF CORRECTION

PATENT NO. : 6,993,208 B2
APPLICATION NO. : 10/176176
DATED : January 31, 2006
INVENTOR(S) : Atsushi Matsumoto It is certified that error appears in the above-identified patent and that said Letters Patent is hereby corrected as shown below:

COLUMN 2:
Line 16, "as;" should read -- as: --.

COLUMN 5:
Line 33, "corresponding" should read -- corresponds --.

COLUMN 6:
Line 4, "nearly" should read -- nearby --.

COLUMN 10:
Line 27, "have" should read -- has --.

COLUMN 15:
Line 12, "the." should read -- the --;

COLUMN 18:
Line 22, "chained" should read -- changed --.

Signed and Sealed this

Fifth Day of December, 2006

JON W. DUDAS
*Director of the United States Patent and Trademark Office*